United States Patent [19]

Ido et al.

[11] 4,425,401

[45] Jan. 10, 1984

[54] MAGNETIC RECORDING MEDIA

[75] Inventors: Tadashi Ido, Yokohama; Hirotaka Yokoyama, Yokosuka; Moriyasu Wada, Ninomiya; Toshihiko Oguchi, Kawasaki; Akio Ishizawa, Tokyo; Yoshiyasu Koike, Chigasaki, all of Japan

[73] Assignee: Tokyo Shibaura Denki Kabushiki Kaisha, Kawasaki City, Japan

[21] Appl. No.: 393,789

[22] Filed: Jun. 30, 1982

[30] Foreign Application Priority Data

Jul. 2, 1981 [JP] Japan .................. 56-102265

[51] Int. Cl.$^3$ ................................. H01F 10/02
[52] U.S. Cl. .................. 428/329; 428/330; 428/694; 428/900
[58] Field of Search .................. 427/127–132, 427/48; 428/900, 694, 695, 328, 329, 330; 252/62.54; 75/0.5 AA

[56] References Cited

U.S. PATENT DOCUMENTS 4,075,672 2/1978 Manly .................. 428/900
4,207,092 6/1980 Berry .................. 427/128 X

OTHER PUBLICATIONS

Finn et al., "Very High Coercivity Particles," *The Complete Handbook of Magnetic Recording*, 1980, p. 193.
Mee, C. D., "Magnetic Material for Tape," *Physics of Magnetic Recording*, 1964, p. 206.
Fayling, R. E. et al., "Magnetic Recording Properties of SmCo$_5$," *IEEE*, vol. 15, No. 5, Sep. 1978.
Fayling, R. E., "Anisotropic Erasure and Demagnetization Characteristics of Recording Tapes Comprising Particles with Uniaxial Magnetocrystalline Anisotropy," *IEEE*, vol. 13, No. 5, Sep. 1977.

*Primary Examiner*—Bernard D. Pianalto
*Attorney, Agent, or Firm*—Schwartz, Jeffery, Schwaab, Mack, Blumenthal & Koch

[57] ABSTRACT

Disclosed is a magnetic recording medium comprising substrate and a resinous composition containing magnetic particles of uniaxially-anisotropic hexagonal crystals having particle diameters of 0.01~0.3 μm and coated on said substrate; the ratio of remanent magnetization to saturation magnetization on the magnetization curve corrected to demagnetizing field which is measured in a direction vertical to the surface of the recording medium, ranging from 0.3 to 0.7. This magnetic recording medium requires no orientation treatment for its production.

5 Claims, 2 Drawing Figures

MAGNETIC RECORDING MEDIA

BACKGROUND OF THE INVENTION

This invention relates to magnetic recording media, and more particularly to media obtained by coating uniaxially anisotropic, hexagonal, magnetic particles onto substrates substantially without orientation, which is suitable for use in high-density magnetic recordings.

For magnetic recording and reproduction purposes, magnetic particles of needle-like crystals such as $\gamma$-$Fe_2O_3$ or $CrO_2$ particles have heretofore been oriented longitudinally in the planes of their respective coating layers so as to make use of their in-plane lengthwise remanent magnetization. However, the above recording and reproducing system has found to be accompanied by such drawbacks that stronger demagnetizing fields occur in magnetic recording media as their densities become higher and their recording and reproducing performance is poor particularly in the shortwave region. In order to overcome such strong demagnetizing fields and to carry out high-density recording, it is necessary to make the magnetic recording layer of each recording medium thinner while increasing its coercive force. Under the present circumstances, it is difficult to enhance the coercivity of magnetic recording layers beyond the present level. In addition, thinner magnetic recording layers will induce a new problem that the characteristics of their reproduction signals will be deteriorated. Accordingly, it is difficult to densify magnetic recordings beyond the present level as long as the above-mentioned conventional system, is used in other words, conventional needle-like magnetic particles oriented longitudinally in the planes of their respective coating layers and utilizing their in-plane lengthwise remanent magnetization.

It has also been proposed, with a view toward finding a breakthrough, to utilize the remanent magnetization in a direction vertical to the plane of each magnetic recording medium. In such a vertically-magnetized recording system, it is necessary to have an easy axis of magnetization in a direction vertical to the plane of each recording medium. Following recording media have been proposed.

As one example of such recording media, a film of a Co-Cr alloy is formed in accordance with the sputtering method on a surface of a base material. However, such a recording medium is not suitable for actual use, because it is accompanied by such drawbacks that both recording medium and magnetic head are subjected to considerable wear through their sliding contact, the recording medium is hard to handle due to its poor flexibility, and suffers from its poor productivity.

As another example, a so-called coating-type vertically magnetized recording medium has also been proposed. It is generally fabricated by coating on a substrate magnetic particles together with an organic binder to form a magnetic recording layer. It has been proposed to employ, as magnetic particles, powder of $Fe_3O_4$ polyhedron or barium ferrite which may optionally contain further substituent element or elements and orient such magnetic particles in directions vertical to the plane of each recording medium. Recording media of this type have improved recording and reproduction performance in the shortwave region and enable a densification of the magnetic recordings. However, it involves such shortcomings that it can achieve only poor contact with a magnetic head due to an excessively high degree of roughness on the surface of its magnetic recording layer and its reproduction output is thus unstable compared with the conventional recording media having needle-like magnetic particles oriented longitudinally in their magnetic recording layers. It is also accompanied with another demerit that no satisfactory recording is feasible by conventional ring-shaped magnetic heads.

From the standpoint of fabrication technology, all the conventional coating-type magnetic recording media have been subjected to an orientation treatment in a magnetic field. Irrespective of using an in-plane lengthwise remanent magnetization or a vertical remanent magnetization, it has been indispensable to subject each magnetic recording medium to an orientation treatment in a magnetic field so as to orient the easy axis of magnetization of each magnetic particle in a desired direction. Such an orientation treatment in a magnetic field requires special facilities such as, for example, orientation magnets and mechanical orientation apparatus. It will certainly be advantageous if such an orientation treatment could be obviated, because it will lead to a simpler fabrication process, energy and man power saving, and a lowered fabrication cost.

It has thus been attempted to use magnetic recording media which were obtained by coating a resinous coating composition containing needle-like magnetic particles onto surfaces of substrates and then simply drying them without applying any orientation treatment in a magnetic field. Here again, it is up to the way of utilization of remanent magnetization of each magnetic particle oriented in a direction vertical to the plane of each recording medium whether high-density magnetic recording is feasible or not. However, the extent of high densification or recording attained was in fact far below the intended level. This is attributed to a very small remanent magnetization component in the vertical direction. In view of these experiences, an application of the orientation treatment in a magnetic field has been considered to be an indispensable step for the fabrication of magnetic recording media.

As has heretofore been described in detail, it was hardly possible to achieve the high densification of recordings by means of needle-like magnetic particles. $Fe_3O_4$ polyhedrons and substituted barium ferrites were capable of attaining high-density recordings. However, they were not satisfactory for actual use because they involved various shortcomings and problems as recording media. In view of the history of development of magnetic recording media, the orientation treatment in a magnetic field has been believed to be an indispensable step and it was certainly out of the question to seek an advantage from their fabrication viewpoint by eliminating the orientation treatment in a magnetic field.

SUMMARY OF THE INVENTION

Accordingly, an object of this invention is to provide, on the basis of the above-mentioned state of the art, a high-density magnetic recording medium which solves the various problems, that the prior art high-density magnetic recording media encountered, and which can be fabricated without any orientation treatment step in a magnetic field.

According to the present invention, there is provided a magnetic recording medium comprising a substrate and a resinous composition containing magnetic particles of uniaxially-anisotropic hexagonal crystals having particle diameters of 0.01~0.3 μm and coated on said substrate; the ratio of remanent magnetization to saturation magnetization (hereinafter called "squareness ratio") on the magentization curve corrected to demagnetizing field which is measured in a direction vertical to the surface of the recording medium, ranging from 0.3 to 0.7.

DETAILED DESCRIPTION OF PREFERRED EMBODIMENTS

Figure 1:
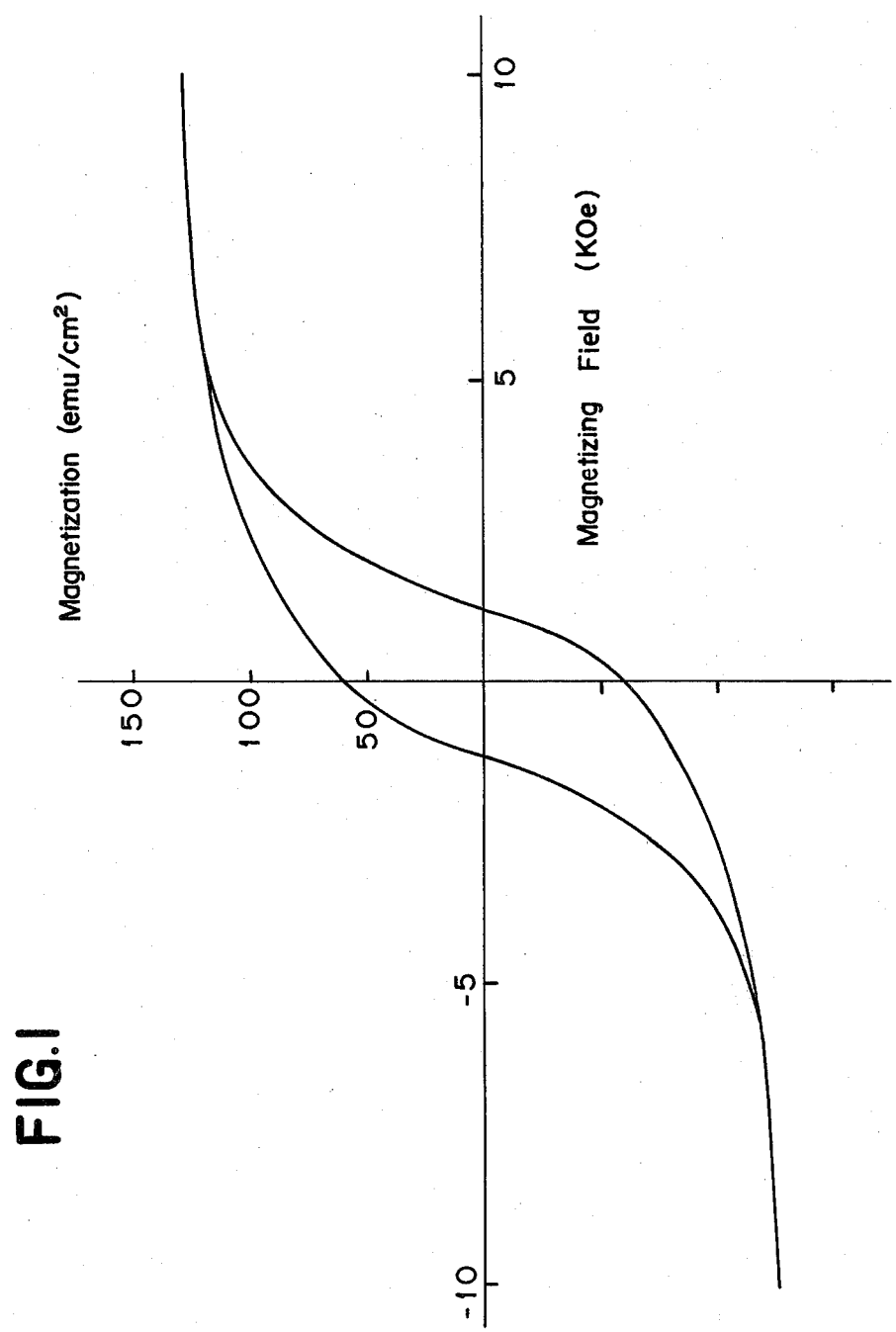

To fabricate a recording medium having a squareness ratio within the above range, it is necessary to coat a resinous composition containing specific magnetic particles dispersed therein onto a substrate and then dry the same, whereby the squareness ratio can be in the intended range of 0.3~0.7. If magnetic particles are layed completely at random, in other words, if magnetic particles are in a completely unoriented state, their squareness ratio is 0.5. It is however sufficient if the squareness ratio falls within a range of 0.3~0.7 as defined in the present invention. Any squareness ratios smaller than 0.3 result in too few magnetic particles oriented in directions vertical to the plane of each recording medium, thus leading to an unfavorably smaller output of remanent magnetization in the vertical direction. On the other hand, any squareness ratios greater than 0.7 result in too many magnetic particles oriented in directions vertical to the plane of each recording medium, thereby unfavorably creating such problems as those encountered in the conventional vertically-magnetized recording media, i.e., resulting in a roughened surface of its magnetic recording layer, unstable outputs, and incompatibility with conventional ring-shaped heads. It is noteworthy that the high-density recording medium according to this invention can be fabricated without need for any orientation treatment in a magnetic field. This is totally unexpected from the aforementioned results obtained from magnetic recording media making use of needle-like particles as magnetic particles.

As specific examples of a magnetic material consisting of uniaxially anisotropic hexagonal crystals which are usable in the practice of this invention, there may be mentioned hexagonal ferrites such as ferrites of Ba, Sr, Pb, Ca and the like, those obtained by substituting a part of Fe in such hexagonal ferrites with Co, Ti, Zn, Nb, Ta, Sb or the like, and Co-Ni and Co-Fe alloys which contain Co as their principal component. Substituted hexagonal ferrites are particularly preferred. Such magnetic particles are required to have particle sizes in the range of 0.01~0.3 μm. Any particle sizes smaller than 0.01 μm do not show ferromagnetism and any particle sizes exceeding 0.3 μm render themselves unsuitable for high-density magnetic recordings.

A resinous composition containing such magnetic particles may be applied, as a coating, onto each substrate in any manner commonly known in the art. For example, such magnetic particles may be dispersed in a composition consisting of a resin such as a vinyl chloride-vinyl acetate copolymer, urethane resin or cellulose derivative, an anionic, nonionic or cationic dispersant, a curing agent and, if necessary, a suitable organic solvent. The resultant coating composition may then be coated onto a substrate by means of a doctor blade or the like. After drying the thus-applied coating composition, a magnetic recording medium is obtained.

The magnetic recording medium according to this invention is capable of performing stable recordings and reproducing them, is notably compatible with ring-shaped magnetic heads which are used most commonly these days, and is suitable for high-density magnetic recordings. It is an advantageous recording medium from the viewpoints of man-power saving, electric power saving and production cost reduction, since it can be fabricated without any orientation treatment in a magnetic field.

This invention will now be described further in detail in the following example, with reference to the accompanying drawings.

IN THE DRAWINGS

Figure 2:
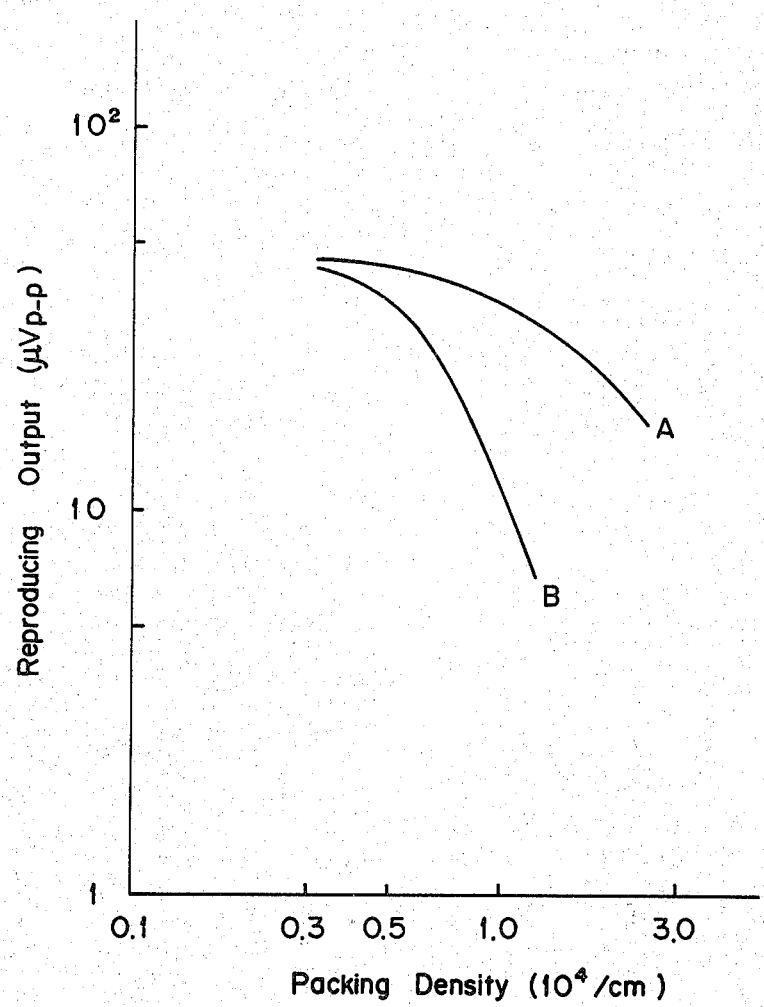

FIG. 1 illustrates a magnetization curve obtained by subjecting a magnetization curve measured in a direction vertical to the surface of a magnetic recording medium of this invention to a correction of a demagnetizing field; and FIG. 2 shows diagrammatically the relationship in packing density and reproducing output between the recording medium A according to this invention and a conventional recording medium B which is given for comparison.

EXAMPLE

A solution containing the chlorides of Ba and Fe as well as other additives for lowering the coercive force, i.e., the chlorides of Co and Ti, was mixed with an alkaline solution of NaOH and $Na_2CO_3$ to obtain a precipitate. The resultant precipitate was then washed and dried into powder, followed by baking the powder at 900° C. for 2 hours to obtain platy Co-Ti-substituted barium ferrite powder. A microscopic observation of the above powder indicated that they have particle sizes in the range of 0.05 μm~0.25 μm. This powder was then intimately mixed with a dispersant such as recitin and a resin such as urethane or vinyl chloride so as to disperse the powder in the dispersant and resin and to obtain a coating composition. This coating composition was applied onto a substrate of ethylene terephthalate to a thickness of about 3 μm by means of a doctor blade. Subsequent to drying, the resultant magnetic recording medium was subjected to a calender processing so as to make its coating surface smoother. FIG. 1 shows a magnetization curve obtained by subjecting the magnetization curve of the thus-obtained recording medium to a correction of a demagnetizing field. From the diagram, its squareness ratio was found to be 0.48. The recording medium was used for recording and reproduction using a conventional ring-shaped head. Its packing density and reproducing output are shown in FIG. 2 (Curve A). Incidentally, the above ring-shaped head had a gap width of 0.15 μm and a track width of 35 μm. For the sake of comparison, data obtained from a routinely employed recording medium in which needle-like particles (Co-coated $\gamma$-$Fe_2O_3$) were oriented longitudinally in its magnetic recording layer are also given as Curve B in FIG. 2. From this figure, it will be readily understood that the magnetic recording medium according to this invention exhibits excellent high-density recording characteristics.

We claim:

1. A magnetic recording medium comprising a substrate and a resinous composition containing magnetic particles of uniaxially-anisotropic hexagonal crystals having particle diameters of from 0.01 to 0.3 μm and coated on said substrate; the ratio of remanent magnetization to saturation magnetization on the magnetization curve for the recording medium, corrected to a demagnetizing field which is measured in a direction vertical to the surface of the recording medium, ranging from 0.3 to 0.7.

2. The magnetic recording medium according to claim 1, wherein the magnetic particles comprise a substituted or unsubstituted hexagonal ferrite.

3. The magnetic recording medium according to claim 2, wherein said hexagonal ferrite is selected from the group consisting of Ba ferrite, Sr ferrite, Pb ferrite and Ca ferrite.

4. The magnetic recording medium according to claim 2, wherein said hexagonal ferrite is selected from the group consisting of Ba ferrite, Sr ferrite, Pb ferrite and Ca ferrite whose Fe part is substituted in part with Co, Ti, Zn, Nb, Ta or Sb.

5. The magnetic recording medium according to claim 1, produced by a process which comprises coating said magnetic particle-containing resinous composition on said substrate and drying the coated substrate, without subjecting the recording medium to an orientation step in a magnetic field.

* * * * *